United States Patent [19]

Fredrickson

[11] 4,327,704

[45] May 4, 1982

[54] ORCHARD HEATER

[76] Inventor: Robert U. Fredrickson, 600 E. Valencia, Burbank, Calif. 91501

[21] Appl. No.: 90,904

[22] Filed: Nov. 5, 1979

[51] Int. Cl.³ .................. A01G 13/06; F24H 1/00; A01G 13/00

[52] U.S. Cl. ...................................... 126/59.5; 47/2; 432/223

[58] Field of Search .................. 126/59.5, 93; 47/2; 432/223

[56] References Cited

U.S. PATENT DOCUMENTS

| | | | |
|---|---|---|---|
| 2,672,333 | 3/1954 | Rocheville | 126/93 |
| 3,205,885 | 9/1965 | Baxley | 126/59.5 |
| 3,421,494 | 1/1969 | Perkins | 126/59.5 |
| 3,563,224 | 2/1971 | Bryer | 126/59.5 |
| 3,580,236 | 5/1971 | Plummer | 126/59.3 |
| 3,809,057 | 3/1970 | Frost | 126/59.5 |

Primary Examiner—Albert W. Davis
Assistant Examiner—Wesley S. Ratliff, Jr.
Attorney, Agent, or Firm—Matthew P. Lynch

[57] ABSTRACT

Provided is an orchard heater adapted especially to radiate heat directly to the bole and middle portions of the trees, the heater comprising an upright, generally elongated and cylindrical combustion chamber having formed therein a vertically extending looped main burner, a pilot burner disposed beneath the main burner, and a divider plate interposed between the former two burners. The burners are positioned such that the discharge orifice of the main burner lies in the plane of the axis of the combustion chamber and is oriented downwardly at the center of the divider plate. The discharge orifice of the pilot burner, in turn, is oriented upwardly to the bottom of the divider plate, the latter being apertured, typically with louvers which enable communication between the discharge orifices of the two burners. Upon ignition of liquid fuel supplied by the main burner in the chamber, the generated heat is initially radially outwardly directed by the divider plate, this heat being oriented in a horizontal plane. Heat impinging on the chamber wall heats the latter and is directed radially and horizontally outwardly therefrom. Simultaneously, heat energy is conducted upwardly by the chamber wall and this heat, in turn, impinges on a frusto-conical hood positioned over the open top of the combustion chamber. The conical surfaces of the hood, upon being heated to radiation point, directs the heat energy radially outwardly and upwardly with respect to the axis of the heater. In addition, the conical surfaces of the hood function to direct ascending exhaust gases radially downwardly.

17 Claims, 9 Drawing Figures

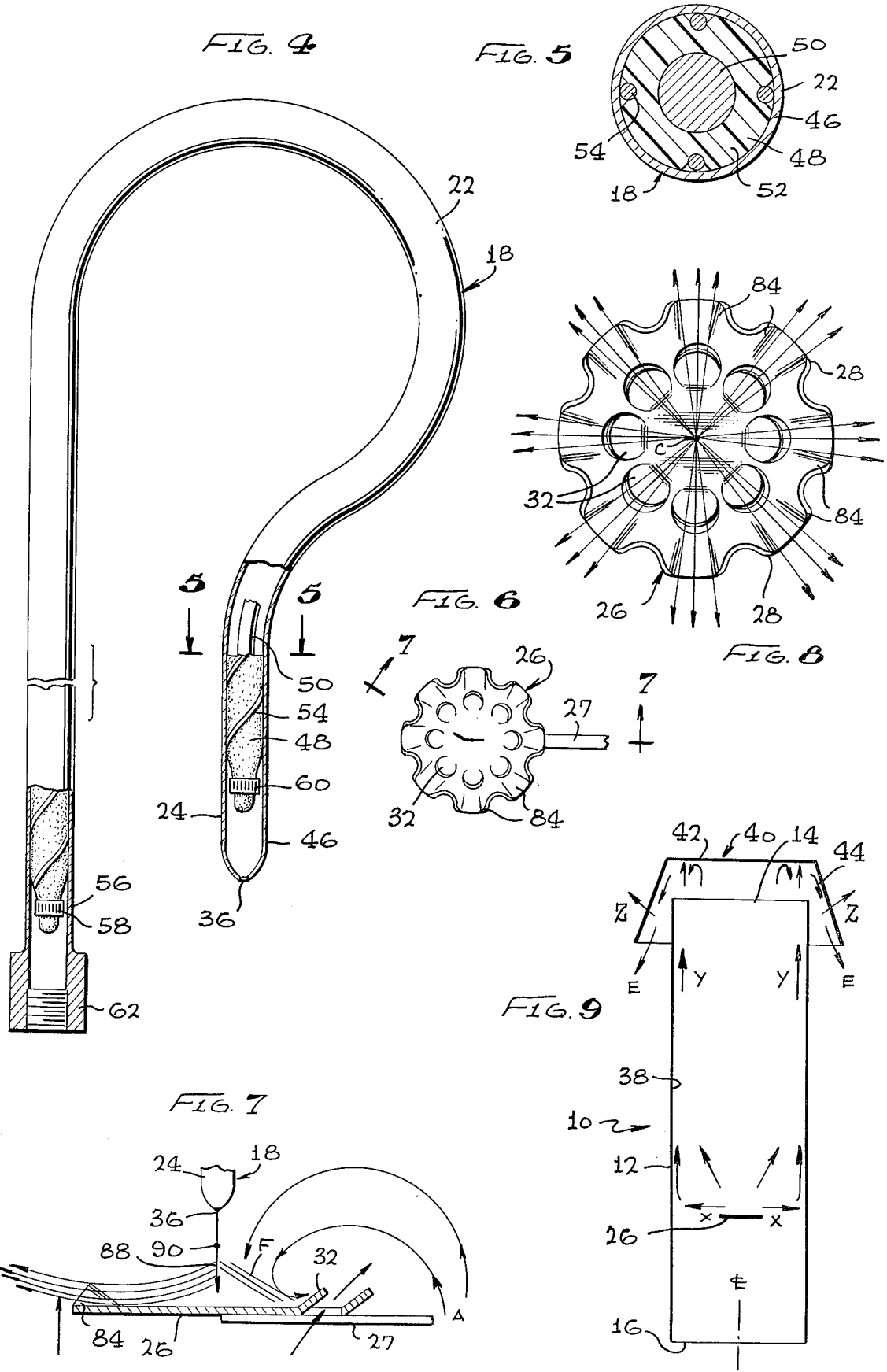

ORCHARD HEATER

BACKGROUND OF THE INVENTION

1. Field of the Invention

The present invention in general, relates to heaters of the type in which liquid fuel is ignited to produce heat energy which, by means of a deflector or deflectors, is subsequently radiated in a desired radiation direction. More particularly, the invention relates to such a heater utilized especially to heat the bole and middle portion of a tree and in which deflector means are provided to direct radiant heat energy outwardly from the heater along a horizontal and angularly upwardly oriented plane.

2. The Prior Art

Already well known in the art are orchard heaters in which liquid fuel is combusted within a combustion chamber and the thus generated heat is radiated outwardly from the heater. Typically, when it is desired that certain portions of a tree, or the like, be heated, deflector members are utilized to beam the heat rays at such desired portions to be irradiated. One such prior art heater has been disclosed in U.S. Pat. No. 3,809,057 to Frost. The heater described in this patent comprises a dome like combustion chamber which has an exhaust port and conical radiant heat deflector which functions to direct rays of radiant heat deflector which functions to direct rays of radiant heat horizontally directly to the bole of the tree. To provide combustion of liquid fuel, a burner assembly is provided at the base of the combustion chamber and which comprises a tubular fuel line which has a spiral portion which forms the burner. An asbestos wick is positioned within this spiral portion and with a burner aperture provided at the end of the spiral. An intermediate chamber is located within the fuel line to relieve back pressure formed therein. The chamber, in the arrangement shown, is filled with steel wool and includes a capillary tube extending therethrough. The capillary tube includes a plurality of capillary holes formed therein which function to permit the fuel to pass therethrough from the chamber to insure the continuous flow of fuel to the burner at all times.

Although this art device provides that generated heat is directed to the bole of a tree, it has the disadvantage that heat emanating from the burner at the bottom of the dome-shaped combustion chamber also, and to quite a substantial extent, irradiates the upwardly inwardly converging conical surfaces of the chamber and which surfaces, in turn, radiate the heat in an unwanted upward direction, which presents a loss of heat energy. In addition, the radiant heat deflector which has the apex of its cone-shaped structure oriented downwardly toward the open upper end or exhaust end of the dome-shaped combustion chamber, does not solely deflect the rays of heat in a radially outwardly horizontal pattern, this for reasons that heat rays impinging upon the conical surfaces of the cone-shaped deflector are not subjected to a 90° deflection by the deflector, rather the cone-shaped deflector will deflect the heat rays at a random angle depending upon the angle at which the heat rays strike the deflector. Assuming, arguendo, that the above discussed prior art device is capable of radiating heat in a horizontal plane, such radiation in a single direction is insufficient in those cases where, for instance, other portions of a tree are to be irradiated.

SUMMARY OF THE INVENTION

Therefore, object of the invention is to overcome the above disadvantages encountered with prior art heater devices and to provide an orchard heater incorporating novel features which enable the heater to provide heat radiation in a horizontal plane and radiation in an angularly upward orientation with a minimum loss of heat energy.

A further object of the invention is to provide an orchard heater of the type which depends on gravity to propel fuel through the fuel lines without the latter being affected by backflow problems encountered with present day burners.

A still further object of the invention is to provide a novel orchard heater which is economical to manufacture, simple to operate, and is simple in construction.

According to the invention, such a novel orchard heater comprises a generally elongated combustion chamber having an open upper end forming the exhaust port of the device. Disposed in upright position within the combustion chamber is a main burner having a looped portion with a discharge orifice formed in the end of the looped portion, the latter end being disposed in a plane described by the main axis of the heater. Located centrally within the chamber and in slightly spaced relation with the end of the main burner looped portion is a divider plate having a circular rim of corrugated configuration, the divider plate forming a first deflecting member enabling heat generated by the main burner to be radially horizontally outwardly directed. The divider plate is formed with louvers enabling a pilot burner disposed beneath the plate to ignite fuel emanating from the main burner discharge orifice, the latter being directed downwardly in direction of the divider plate. Heat impinging on the cylinder wall is conducted, in part, upwardly to a frusto-conical hood positioned over the exhaust port of the combustion chamber, the conical surfaces of the hood serving as a second heat deflector to provide radiation of heat energy in an angularly upward orientation. Hence, heat generated in the combustion chamber heats:

(a) the fuel in the main burner to flashpoint;
(b) heats the walls of the combustion chamber to effect radial horizontal heat radiation; and
(c) heats the conical surfaces of the hood to effect heat radiation in an angular upward orientation.

Further features, objects and advantages of the invention will become apparent from the following description when taken in connection with the accompanying drawings, in which:

BRIEF DESCRIPTION OF THE DRAWINGS

FIG. 4 is an elevational view, partly in section, of the main burner incorporated in the assembly of FIG. 1;

FIG. 5 is a cross-sectional view of a main burner section taken on line 5—5 of FIG. 4;

FIG. 6 is a top view of the divider plate incorporated in the heater and taken on line 6—6 of FIG. 2;

FIG. 7 is a side elevational view of the divider plate taken on line 7—7 of FIG. 6;

FIG. 8 illustrates an enlarged top view of the divider plate and showing the deflection directions effected by the plate; and FIG. 9 is a diagrammatic cross-sectional view of the heater structure, illustrating the heat flow and directions of radiant energy from the structure.

DESCRIPTION OF THE PREFERRED EMBODIMENT

Figure 1:
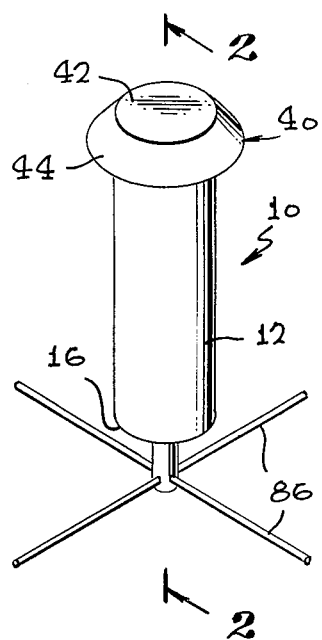
FIG. 1 is a perspective view of the orchard heater of the present invention.
Figure 3:
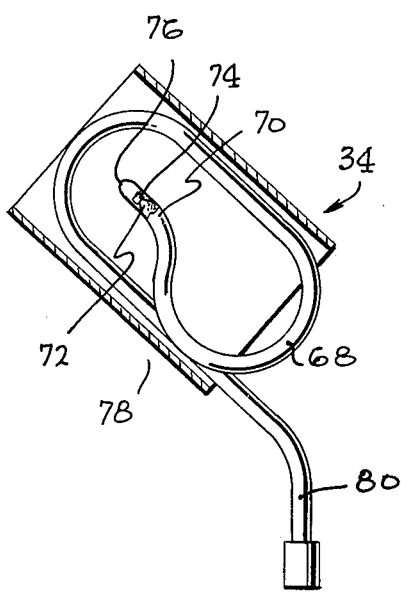
FIG. 3 is an elevational view, partly in section, of the pilot burner incorporated in the heater of FIG. 1.
Figure 2:
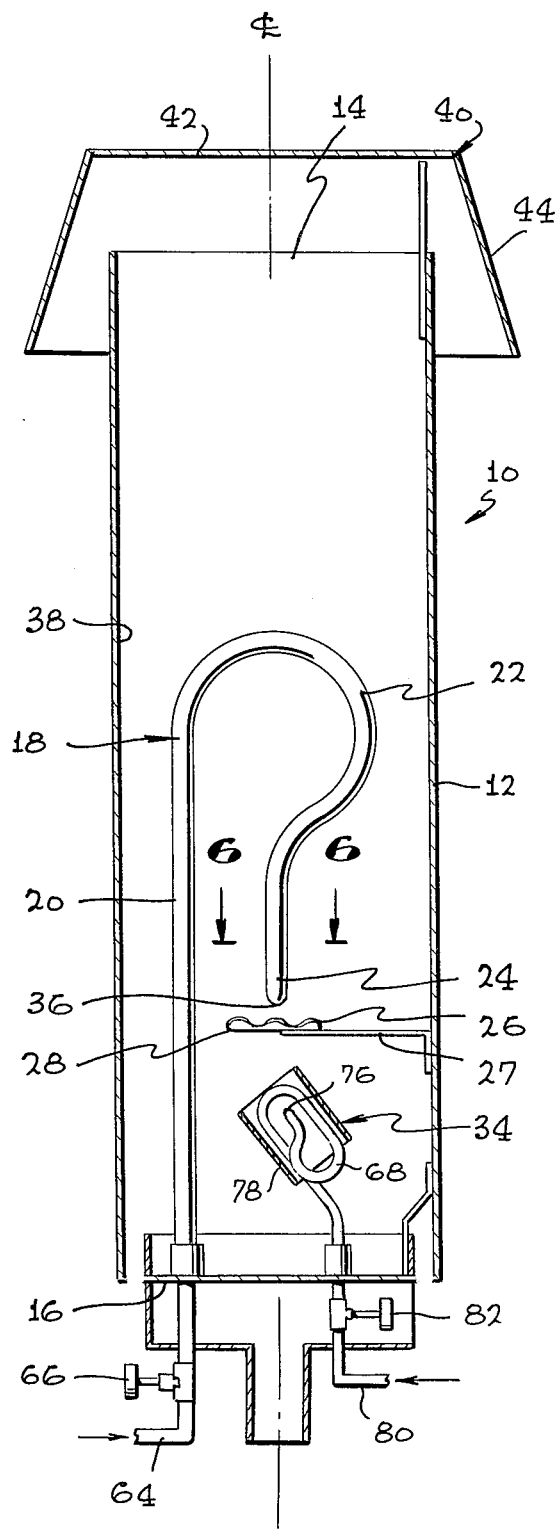
FIG. 2 is a cross-sectional view of the heater taken on line 2—2 of FIG. 1.

Referring now to the drawings in which like reference numerals index like parts and with attention initially directed to FIGS. 1 and 2, the orchard heater indexed generally at 10, essentially comprises a generally elongated cylindrical combustion chamber 12 having an open upper end 14 forming the exhaust port of the heater, and a base 16.

Disposed vertically within combustion chamber 12 is a main burner indexed generally at 18 having an upright portion 20, a looped portion 22, and a terminating straight end portion 24, the latter end portion lying in a plane described by the main or long axis $C_L$ of the heater, FIG. 2.

Located centrally within the chamber, in concentric relation therewith, and slightly spaced from end portion 24 of main burner 18 is a divider plate 26 formed with a generally circular rim 28 of corrugated configuration, FIGS. 6, 7 and 8. Divider plate 26 is connected to the burner body via a suspension 27 and, in this arrangement, forms a first deflecting member enabling heat generated by main burner 18 to be radially outwardly directed in a horizontal plane X, FIGS. 1 and 9. The divider plate, typically, is apertured with louvers 32, FIG. 6, enabling a pilot burner, indexed generally at 34 and disposed beneath the plate 26, to ignite fuel emanating from discharge orifice 36 of main burner section 24, the orifice being directed downwardly to the center of divider plate 26, FIG. 7.

Divider plate 26, as the name implies, deflects, divides and effects a mixing of air and fuel for optimum clean burning. This is the main function of divider plate 26.

Heat impinging on inner cylindrical wall 38, FIG. 9, is conducted, in part, upwardly in direction Y, FIG. 9, to a frustoconical hood 40 positioned over exhaust port 14 of combustion chamber 12. The hood includes a frustum 42 which extends parallel with base 16 of chamber 12, and includes a conical annular rim which defines a conical surface 44, the latter serving as a second heat deflector to provide radiation of heat energy in an angularly upward orientation Z, FIG. 9. From the above it will be appreciated, that cylindrical wall 12 is the main radiant heat energy source.

As clearly shown in FIGS. 4 and 5, the burner 18 which, in the inventive embodiment, also forms the system's fuel supply line, is composed of an outer tubular member 46 which encloses an inner core 48 including an inner metallic center 50, a layer of heat resistant material 52 about center 50, and a metallic wire wound spirally about layer 52. At the beginning of one end 56 of heater 18, the core 48 is clamplingly enclosed by a collar 58 to retain the individual components of the core in position relative to each other. Likewise, the opposite end of main burner 18 is provided with such a collar 60, the latter being positioned a short distance before the fuel discharge orifice 36. Inlet end 62 of main burner 18 is threadably secured to a fuel source supply line 64 via a needle valve 66 which is effective to control the supply of fuel to main burner 18. The burner fuel line, for instance, is such that upon ignition of burner 18, the fuel in tube 46 is brought to flash-point. Typically, in the arrangement shown, the layer of heat resistant material 52 urges wire 54 into engagement with outer tube 46, thereby effecting a positive contact between the wire and tube, FIG. 5.

The pilot burner 34 includes a coil-shape heating element 68 which, construction-wise, is identical with the fuel line supply structure of main burner 18. The coil includes an outer tube 70 and an inner core 72 which has provided thereon a clamping collar 74 just adjacent the fuel discharge opening 76, the latter being directed towards the center of the lower surface of divider plate 26, thereby to evenly and uniformly distribute ignition energy through louvers 32. Hence, these louvers serve to enable the pilot burner to ignite fuel emanating from main burner discharge orifice 36.

The coiled pilot burner is enclosed within an oval chamber 78 to enhance combustion of fuel emanating from orifice 76. The pilot burner 34 is coupled to a fuel source supply line 80 via a regulating valve 82, FIG. 2.

Divider plate 26 having its center C, FIG. 8, extending concentrically with burner center line $C_L$, FIG. 2, directs ignited fuel impinging thereon to mix with additional air A, FIG. 8, from louvered openings 32, the ignited fuel being divided by corrugations 84 in rim 28. The flame F, FIG. 8, is directed radially outwardly to inner wall 38 of burner 10 via the corrugations and the orientation of heat energy is, as hereinbefore discussed, horizontal in direction X.

The inner cylindrical wall 38, upon being thoroughly heated, conducts the heat upwardly, FIG. 9. This, in turn, heats the hood 40, the conical surface 44 serves to effect radially outward radiation in angular upward orientation. In addition, the downwardly oriented conical surface 44 enables deflection of exhaust gases from chamber 12 in angular downward orientation.

The heater 10, typically, is positioned one-half foot above ground and is supported by leg members 86, the latter being secured to base 16. Horizontal radiation of heat energy, generally, is within the range of one-half to three feet above ground. This range, of course, may be adjusted by varying the length of chamber 12, the height of burner 18 and divider plate 26 related to ground or the spacing between base 16 and ground.

From the above it will be noted that ignited fuel is divided into segments for maximum mixing of fuel and air. The draft caused by the heat exhaust at the top of cylindrical chamber 12 pulls in air from the bottom of chamber 12 and which passes upwardly past corrugations 84 and louvers 32. The multiplicity of louvers 32 permit passage of air to the point of flame 88, FIG. 7. The reference numeral 90, FIG. 7, denotes the fuel at vapor point.

It should be noted that various modifications can be made to the heater while still remaining within the purview of the following claims.

What is claimed is:

1. A heater for use in combination with a fuel source comprising:
    a combustion chamber having an enclosing side wall, said combustion chamber having a longitudinal center axis;
    burner means fixedly located within said chamber spaced from said side wall effective to ignite fuel from said fuel source producing heated gases;
    first deflecting means fixedly mounted within said combustion chamber to direct said heated gases transversely to said longitudinal center axis and against said side wall to thereby heat the said side wall, said heat is to then be radiated into the ambient;

second deflecting means connected with said combustion chamber located to encounter said heated gases being discharged from said combustion chamber, said second deflecting means having an encasing side wall, said encasing side wall being located about a portion of said said enclosing side wall, said encasing side wall being spaced from said enclosing side wall, heat being radiated from said second deflecting means in an outward direction into the ambient;

said burner means comprises a main burner formed of an elongated member which includes a looped portion terminating in a discharge orifice, said discharge orifice being located on said longitudinal center axis; and said burner means further comprises a pilot burner, said first deflecting means being located between said main burner and said pilot burner.

2. The heater of claim 1, wherein said discharge orifice being oriented toward the geometric center of said first deflecting means.

3. The heater of claim 2, wherein said first deflecting means is in the form of a flame divider plate, said geometric center of said first deflecting means being disposed on said longitudinal center axis.

4. The heater of claim 3, wherein said divider plate is formed with a corrugated rim, the corrugations enabling uniform radial deflection of heat from said plate.

5. The heater of claim 4, wherein said divider plate is further formed with a plurality of louvered openings affording connection between said pilot burner and said discharge orifice of said main burner to effect ignition of fuel emanating from said main burner, said louvered openings further providing the introduction of additional air to the ignition area of the chamber.

6. The heater of claim 5, wherein said pilot burner is coil-shaped and is enclosed in an intermediate chamber within said combustion chamber.

7. The heater of claim 6, wherein said pilot burner includes a fuel line comprised of an inner metallic core and a layer of heat resistant material about said metallic core, a metal wire wound spirally around said layer of heat resistant material, the free end of said pilot burner terminating into an aperture disposed on said longitudinal center axis.

8. The heater of claim 7, wherein said pilot burner is linked to said fuel source via a regulating valve.

9. The heater of claim 1, wherein said elongated member of said main burner includes a core with a metal wire wound around said core, said core and said metal wire being enclosed within said elongated member, said elongated member to supply fuel by gravity to said discharge orifice.

10. The heater of claim 9, wherein said metal wire is spirally wound and wherein the flow of fuel through said elongated member follows said spirally wound metal wire.

11. The heater of claim 9, wherein said core comprises a metallic center and a woven layer of heat resistant material surrounding said metallic center.

12. The heater of claim 9, wherein said main burner is linked to said fuel source via a regulating valve.

13. The heater of claim 1, wherein said second deflecting means comprises a frustoconical hood.

14. The heater of claim 13, wherein said frusto-conical hood has a planar base, said planar base being perpendicular to said longitudinal center axis.

15. The heater of claim 14, wherein the portion of said enclosing side wall located furtherest from said frusto-conical hood being connected to a base, said frusto-conical hood serving to exhaust said heated gases into the ambient toward said base.

16. An orchard heater for use in combination with a fuel source, comprising:

an elongated cylindrical combustion chamber having a longitudinal center axis, said combustion chamber including a base at its lower end and an exhaust port at its upper end;

a frusto-conical hood positioned over said exhaust port and including a planar base positioned parallel with said base of said combustion chamber, said frusto-conical hood having a conical surface oriented to redirect the heated gases from said exhaust port toward said base of said combustion chamber;

a burner assembly disposed within said chamber to generate heat therein, said burner assembly including a main burner terminating in fuel discharge aperture disposed along said longitudinal center axis of said combustion chamber, and a pilot burner disposed adjacent said main burner and effective to ignite fuel emanating from said main burner fuel discharge aperture;

a divider plate positioned between said main burner fuel discharge aperture and said pilot burner for providing connection between said main burner and said pilot burner, said divider plate also being effective to deflect ignited fuel from said main burner fuel discharge aperture radially outwardly towards the wall of said cylindrical combustion chamber, said divider plate having a geometric center coinciding with said longitudinal center axis of said combustion chamber.

17. The heater of claim 16, further comprising conduit means for the supply of fuel from said fuel source to said main burner and said pilot burner, and comprising valve means in said conduit means to regulate the fuel supply to said aforementioned burners.

* * * * *